United States Patent [19]
Bryant

[11] 3,969,972
[45] July 20, 1976

[54] MUSIC ACTIVATED CHROMATIC ROULETTE GENERATOR

[76] Inventor: Robert L. Bryant, Box 6, Dry Fork, Va. 24549

[22] Filed: Apr. 2, 1975

[21] Appl. No.: 564,361

[52] U.S. Cl. .............................. 84/464; 179/1 SP; 358/81
[51] Int. Cl.² ...................... A63J 17/00; H04M 1/00
[58] Field of Search ....................... 84/DIG. 6, 404; 178/6.8; 179/1 SP; 358/81

[56] References Cited
UNITED STATES PATENTS

| | | | |
|---|---|---|---|
| 2,500,046 | 3/1950 | Riesz | 179/1 SP |
| 2,804,500 | 8/1957 | Giacoletto | 179/1 SP |
| 3,581,192 | 5/1971 | Miura | 179/1 |
| 3,604,852 | 9/1971 | Weintraub | 84/464 |
| 3,627,912 | 12/1971 | Hearn | 358/82 |
| 3,723,652 | 3/1973 | Alles et al. | 179/1 SP |

Primary Examiner—Edith Simmons Jackmon
Attorney, Agent, or Firm—Griffin, Branigan and Butler

[57] ABSTRACT

A system for creating and displaying colored roulette curves representative of music on a screen includes an X-,Y-deflection control circuit which is driven in part by at least two musically-related fixed frequency signals. These frequencies are taken from an arithmetic progression of pseudo-tempered scale tones and are very nearly equal in frequency to frequencies of tones in the geometric progression of tempered scale music tones. In addition, they form a ratio of integers, one to the other, approximately equal to [N(1.0594631)n]/N, where N is an integer, n—1 is the number of tones skipped between two corresponding tones in the tempered scale, and (1.0594631)/1 is the common ratio relating adjacent tempered scale music tones as well as the common difference in various arithmetic progressions of pseudo-tempered scale tones as related to changes in musical key. These fixed frequency signals are each divided into quadrature components and, after being amplitude modulated by audio-derived music signals, applied to the X-,Y-deflection control circuits. A circuit for determining the colors of the roulette curves receives audio-derived music signals, separates these signals into various frequency bands, splits these frequency bands into components phase-shifted from one another and applies respective like phase-shifted components to respective color producing elements. Audio-derived music signals are also used to vary the brightness of the display. The tint of the roulettes is determined by the phase relationship between the audio-derived music signals which are used to control brightness and those which are used to control color. Solo-tone-produced roulettes are given added color and tint by insertion of fixed musically-related tones. A high-frequency signal may be used for amplitude modulation of the X-,Y-deflection signals to increase the width of the trace.

11 Claims, 13 Drawing Figures

$N'/N = 11/2$
$N_A \approx 3000(N+N')$

PHASE $\approx +120°$

PHASE $\approx 0°$

PHASE $\approx -120°$

PHASE $\approx -60°$

FIG. 2f

$N_C$ or $N_B = 3(N+N')$
PHASE ≈ 0°

FIG. 2g

$N_C$ or $N_B = 3N$
PHASE ≈ 0°; (α = −30°)

| I | II NATURAL RATIOS | III COMMON CHORDS | IV TEMP. FREQ. | V TEMP. RATIOS | VI n | VII PSEUDO-TEMPERED RATIOS |
|---|---|---|---|---|---|---|
| D | 9 | o | 587.330 | 2.2242 | 14 | 83 |
| C | 8, 16/15 | o | 554.365 | 2.1993 | 13 | 70 |
| B | 9 | o | 523.251 | 2.0000 | 12 | 70/66, 2 |
| A₄ | 5, 25 | oooo, o | 493.883 | 1.8877 | 11 | 66 |
| G | 3, 36 | o, oo, o | 466.164 | 1.7810 | 10 | 37 |
| F | 4, 5 | o, oo, o | 440.000 | 1.6817 | 9 | 35 |
| E | 5, 6 | o, ooo, oo | 415.305 | 1.5874 | 8 | 3 |
| D | 9 | o, oo, oo | 391.995 | 1.4983 | 7 | 99 |
| C | 3, 25, 16 | o, oo, o | 369.994 | 1.4142 | 6 | 4 |
| C₄ | 8, 4 | oooooooooo | 261.625 | 1.0000 | 0 | 33 37 35 3 70 2 22 22 37 35 1 33 37 |

MUSIC ACTIVATED CHROMATIC ROULETTE GENERATOR

BACKGROUND OF THE INVENTION

This invention relates broadly to the art of devices for creating and displaying visual representations of sound and, in particular, a system for converting music into colored configurations portraying the music.

Prior art systems related to converting sound into visual representations are described in U.S. Pat. Nos. 2,500,646 to Riesz; 2,804,500 to Giacoletto; 3,175,121 to Birnbaum et al; 3,581,192 to Miura et al; 3,604,852 to Weintraub; 3,612,755 to Tadlock; 3,627,912 to Hearn; 3,723,652 to Alles et al; and 3,742,125 to Siegel.

Many of these patents, such as Giacoletto (2,804,500), describe systems which include filters for separating musically-derived signals into three contiguous frequency bands and applying the detected envelopes of the bands to corresponding red, blue, and green control grids of tri-color kinescopes. When complex signals are applied to such systems, such as music, complex, changing, geometric patterns of color are produced which are incoherent due to use of non-musical fixed frequency deflection signals. In addition, most music has a predominance of low, medium, or high frequencies such that patterns of one primary color or primary color combination, becomes monotonously prevalent in such systems, due to lack of color signal phase control. Thus, it is an object of this invention to provide a music display device whose patterns of color are coherent and the color combinations are not monotonous.

Riesz (2,500,646) describes a system for splitting a speech-derived signal into two contigous frequency bands and applying the signals of each of these frequency bands to orthogonal beam deflection circuits, there being a 90° phase difference between the signals fed to the orthogonal deflection circuits. Riesz points out that this arrangement produces a stationary or fixed trace, or pattern, on a cathode ray tube's flourescent screen whenever the signals are in the ratio of integers. The fixed patterns depicted and described by Riesz are five-petaled rosettes, although his system is not limited to such a pattern. Riesz's system allows individual tones in speech to create such patterns by coincidence. If the signal were a musically-derived signal, such a system would create images which would be unduly jumbled due to quadrature phase distortion over a wide frequency range, so that an observer could not easily distinguish patterns related to music. It is therefore yet another object of this invention to provide a system for displaying representations of music in the form of well formed, symmetrical, coherent patterns, easily followed by an observer.

Many of the patents listed above describe systems which are compatible with normal television sets. That is, they employ the normal horizontal and vertical deflection circuits of television sets to be used therewith. Such systems create color patterns which are displayed in cooperation with existing vertical and horizontal scans. These systems are quite complicated in structure and, because they are limited to a fixed system of vertical and horizontal scans, their images are generally lacking in excitement. Thus, it is an object of this invention to provide a system for creating color configurations representative of music whose patterns are intimately related to all of the physical characteristics of music so as to be exciting but yet are coherent and distinguishable.

SUMMARY OF THE INVENTION

According to principles of this invention, a system for creating and displaying colored roulette curves representative of music employs fixed tones of frequencies in an arithmetic progression, and which belong to a "pseudo-tempered" music scale, to drive X-,Y-deflection devices to display hypotrochoid curves. The fixed tones are amplitude modulated by musical, audio-derived signals prior to driving the X-,Y-deflection devices to display an infinite variety of roulette curves. The frequencies of tones in the pseudo-tempered scale are very nearly equal to frequencies of notes in the standard tempered music scale. Further, these tones lie in an arithmetic progression and form a ratio of integers, one to the other, approximately equal to $[N(1.0594631)^n]/N$, where $N$ is an integer and $n-1$ is the number of tones skipped between the tones in a corresponding geometric progression of tempered scale tones. In addition, the musical audio-derived signals are used to determine the colors and tints of the roulette curves. The system selects each and every particular tone or, alternatively, tone bands, from the musical audio-derived signal and separates each of these tones or tone bands into three signal components which are out of phase with each other. All of the out-of-phase signals respectively corresponding to a particular phase relationship are used to drive particular color elements.

BRIEF DESCRIPTION OF THE DRAWINGS

Other objects, features and advantages of the invention will be apparent from the following more particular description of the preferred embodiment of the invention as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
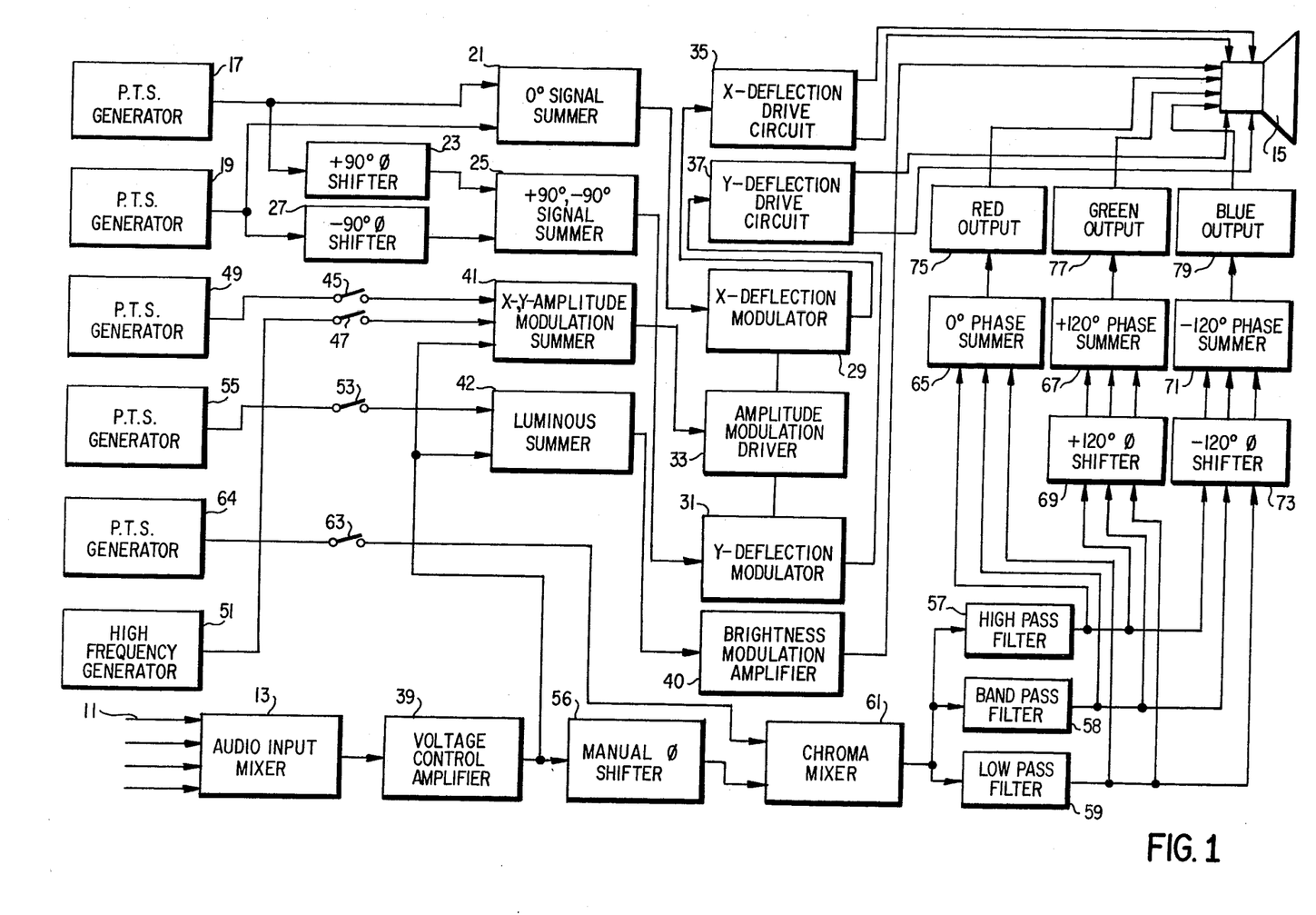
FIG. 1 is a block diagram of a music activated chromatic roulette generator employing principles of this invention.

Referring now to FIG. 1, a musical audio input, or audio inputs, 11 are inserted into the system at an audio input mixer 13. The musical audio inputs 11 could come from individual musical instruments or from channels of sound systems such as radios, record players, tape players and the like. In the case where there is only one channel of audio signals involved, the audio input mixer 13 is not needed. However, where there is more than one channel, as depicted in FIG. 1, an audio input mixer is required to effectively sum these signals. Such a summing circuit is described in ELECTRONICS, CIRCUIT DESIGNERS'S CASE BOOK, 14-B, Page 84, published by Electronics, McGraw-Hill, Inc., 1221 Avenue of the Americas, New York, New York 10020, however other similar circuits could also be used.

The basic function of the overall circuit of FIG. 1 is to portray the audio-derived signal issuing from the audio input mixer 13 on a screen of a kinescope 15.

Describing the X-,Y-deflection circuit of the kinescope 15, pseudo-tempered scale (PTS) generators 17 and 19 generate synthetic tones having frequencies falling in a pseudo-tempered scale which is described in detail below. These frequencies fall in an arithmetic progression, i.e., they are in a ratio of integers. Further, they are very nearly equal to the frequencies of tempered scale music tones as is described below. The tone from the PTS generator 17 is applied to a 0° signal summer 21 and, via a +90° phase shifter 23, to a +90°, —90° signal summer 25. The signal summers 21 and 25 can be identical to the audio input mixer 13 described above. The signal from the PTS generator 19 is applied directly to the 0° signal summer 21 and to the +90°, —90° signal summer 25 via a —90° phase shifter 27. The phase shifters 23 and 27 may be of the type depicted and described in GRAEME, APPLICATIONS OF OPERATIONAL AMPLIFIERS THIRD-GENERATION TECHNIQUES, Page 103, FIG. 3.30, The BB Electronics Series, McGraw-Hill Book Company (1973).

The signals issuing from the 0° signal summer 21 and the +90°, —90° signal summer 25 are respectively fed via an X-deflection modulator 29 and a Y-deflection modulator 31, both of which are driven by an amplitude modulation driver 33, to an X-deflection drive circuit 35 and a Y-deflection drive circuit 37. The X- and Y-deflection modulators 29 and 31 could be of the type depicted and described in RCA SOLID STATE DATABOOK SERIES, SSD-202, Page 239, FIG. 19, (1972). The amplitude modulation driver 33 could be of the type depicted and described in this same book page 189, FIG. 16. The X- and Y-deflection drive circuits 35 and 37 could be any power amplifiers of good quality and sufficient power, such as the RCA rype HC2000H power hybrid circuit operational amplifier described in RCA SOLID STATE '75 DATABOOK SERIES SSD-204B, POWER TRANSISTORS AND POWER HYBRID CIRCUITS, Page 744 (1973). The amplitude modulation driver 33 amplitude modulates the deflection signals in response to the audio-derived signal from the audio input mixer 13, after it has passed through a voltage control amplifier 39 and an X-,Y-amplitude modulation summer 41. The voltage control amplifier 39 evens up the signal levels of received audio signals but provides some degree of dynamic range so that soft music looks like soft music and peak crescendo does not overdrive subsequent elements. Such an automatic gain control circuit is described in GRAEME, APPLICATIONS OF OPERATIONAL AMPLIFIERS THIRD-GENERATION TECHNIQUES, Page 217, Section 6.4.2, McGraw-Hill Book Company, (1973). The X-,Y-amplitude modulation of summer 41 can be identical to the audio input mixer 13 described above.

When it is desired, an additional synthetic pseudo-tempered scale tone can be added to the audio-derived tone by closing the switch 45 to bring the PTS generator 49 into communication with the X-,Y-amplitude modulation summer 41. Similarly, by closing a switch 47 a high frequency signal generated by a high-frequency generator 51 can be summed to the audio-derived signal in the X-,Y-amplitude modulation summer 41.

In addition to the deflection circuit, the audio-derived signal is also used to drive a brightness modulation amplifier 40 for the kinescope 15 via a luminous summer 42. The luminous summer 42 can be identical to the audio input mixer 13 described above. By closing a switch 53 a pseudo-tempered scale tone issuing from a PTS generator 55 can be summed with the audio-derived signal prior to its being used to control the brightness of the kinescope 15.

Turning now to the color control circuitry, the audio-derived signal passes from the voltage control amplifier 39 through a manual phase shifter 56 to a high-pass filter 57, a bandpass filter 58, and a low-pass filter 59 via a chroma mixer 61. The high-, band, and low-pass filters 57, 58 and 59 respectively pass high frequency tone signals, intermediate frequency tone signals, and low frequency tone signals. The manual phase shifter 56 can be identical to the phase shifters 23 and 27 described above with switched variable passive elements to achieve 0° to ± 180° phase shift. A circuit which could be used to provide the three filters 57, 58, and 59 is described in ELECTRONICS, CIRCUIT DESIGNER'S CASE BOOK, 14-B, Page 97, FIG. 3, Electronics, Electronics, Inc., 1221 Avenue of the Americas, New York, New York 10020. The chroma mixer 61 can be identical to the audio input mixer 13 described above. When a switch 63 is closed, a synethic or pseudo-tempered scale tone from a PTS generator 64 is mixed with the audio-derived signal in the chroma mixer 61 prior to the signal being filtered by the high-, band, and low-pass filters 57, 58, and 59.

The signals from the high-, band, and low-pass filters 57, 58, and 59 are fed, in parallel, directly to a 0° phase summer 65; to a +120° phase summer 67 via a +120° phase shifter 69; and to a —120° phase summer 71 via a —120° phase shifter 73. The summers 65, 67, and 71 may be identical to the audio input mixer 13 described above. The +120° and —120° phase shifters 69 and 73 can be similar to the phase shifters 23 and 27, also described above but with elements thereof set to provide the desired phase shift. In this regard, each of the phase shifters 69 and 73 is composed of a plurality of subphase shifters each to handle a different frequency band. The sum of the 0° phase component signals are used to drive the kinescope's red output circuit 75; the sum of the +120° phase component signals are used to drive the kinescope's green output circuit 77, and the sum of the —120° phase component signals are used to drive the kinescope's blue output circuit 79.

Describing in more detail the pseudo-tempered scale (PTS) mentioned above, the PTS generators 17, 19, 49, 55, and 64 generate synthetic or pseudo-tempered music sine wave signals which are very nearly equal in frequency to tones in the tempered music scale.

However, they are adjusted from the tempered scale frequencies to fall into an arithmetic progression in a similar manner to the natural music scale.

In the way of background, as is well known, the frequencies of notes in the natural music scale are interrelated by ratios formed of whole numbers or integers N and N'. For example, a four tone chord, A6 is comprised of tones A, C sharp E, and F sharp having frequencies beginning in the fourth octave for instance, of 440 Hz, 550 Hz, 660 Hz, and 733⅓ Hz which are interrelated in accordance with 1. $f_1(N'/N) = f_2$ where $f_1$ and $f_2$ are note frequencies, as follows: $440(5/4) = 550$; and $550(6/5) = 660$; and $660(10/9) = 733\frac{1}{3}$. Multiplying the N and N' integers in each of the formulas' ratios by an appropriate constant, changes these formulas to $440(15/12) = 550$; and $550(18/15) = 660$; and $660(20/18) = 733\frac{1}{3}$. Now rearranging the basic formula to 2. $f_1/N = f_2/N'$ and using the modified ratio integers, the following interrelationships of the frequencies can be shown to exist: $440/12 = 550/15 = 660/18 = (733\frac{1}{3})/20 = 36\frac{2}{3}$ Hz.

Thus, the frequencies of these notes lie in an arithmetic progression whose first term and common difference is $36\frac{2}{3}$ Hz.

Turning next to the tempered scale, which is in common use by musicians, the counterpart tempered scale frequencies of the above mentioned notes in the A6 chord are:

440 Hz  554.365 Hz  659.256 Hz  739.988 Hz

The frequencies are slightly different from those of the natural scale. There are no precise integer ratios interrelating these frequencies as in the natural scale because they do not lie in an arithmetic progression, but rather in a geometric progression whose common ratio is approximately $1.0594631/1$. The ratio between any two tones in the progression may be expressed as $(1.0594631)^n/1$, where $n-1$ is the number of tones skipped between the two tones. Again, this ratio cannot normally be produced by integers.

Figure 3:
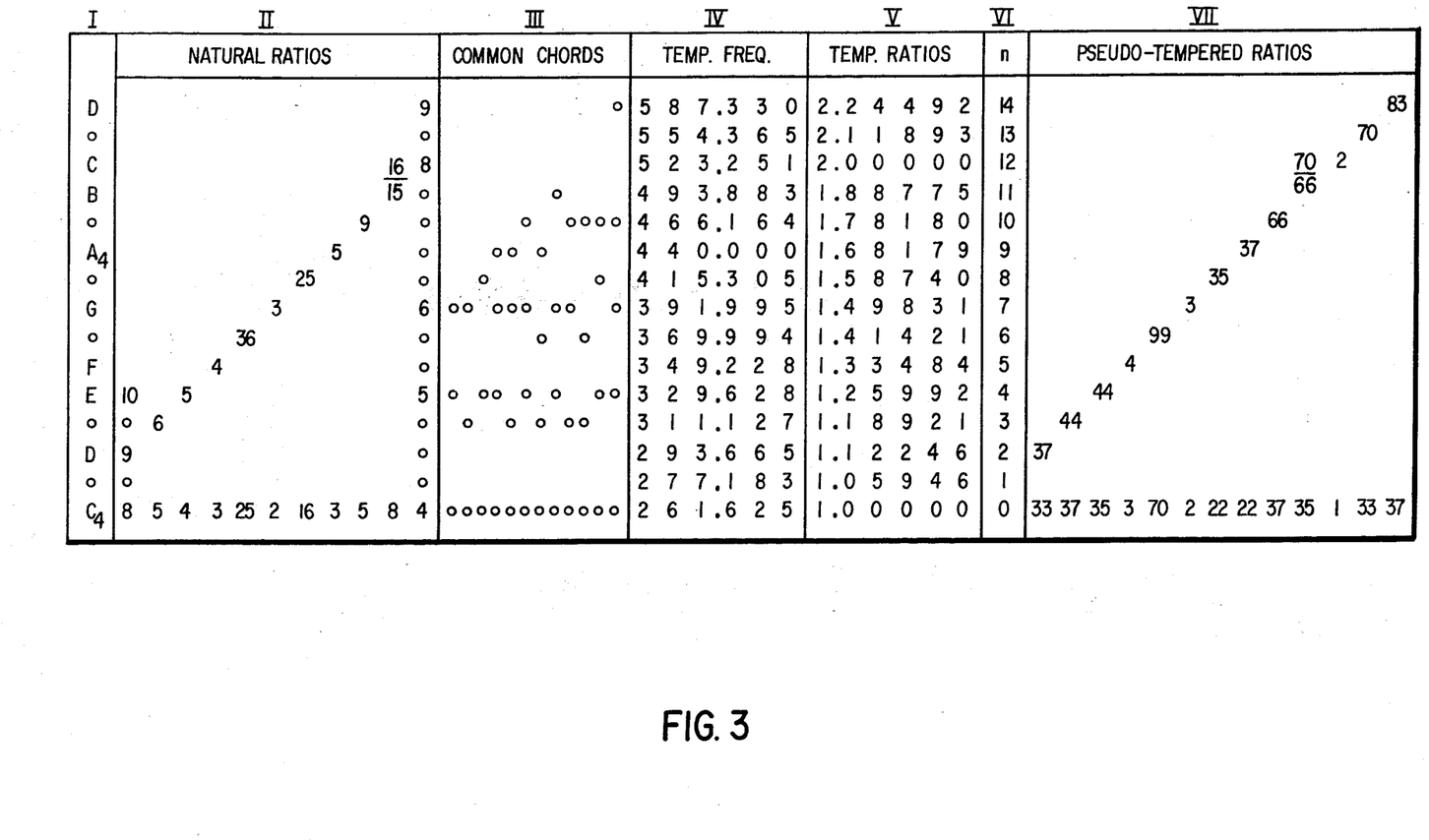
FIG. 3 is a chart illustrating the correlation between the "pseudo-tempered" scale of tones and standard music scales.

Finally, the pseudo-tempered scale is a cross between the natural and the tempered scale. That is, the tones of this scale have frequencies which are interrelated by ratios formed of integers N'/N, similar to the natural scale, but which are also interrelated by the ratio $(1.0594631)^n/1$ as in the tempered scale. This is accomplished by letting the integer N' be approximately equal to $N(1.0594631)^n$, such that the ratio of integers is Column II lists integers — N' in a diagonal line and N in a horizontal line — which form ratios to relate the frequencies of the various notes in the natural C-major scale to the frequency of the note $C_4$. It is common practice to select the frequency of $A_4$ to be 440 Hz as standard. The frequency of $C_4$ is found by applying formula (2), as follows: $f_1/N = f_2/N'$; $C_4/3 = A_4/5$; $C_4 = A_4(3/5)$; $C_4 = 440(3/5) = 264$ Hz. Other tone frequencies in the natural C-major scale may be found by applying formula (1), for example $E_4$ is found as follows: $f_2 = f_1(N'/N)$; $E_4 = C_4(5/4)$; $E_4 = 264(= 330$ Hz. As an added note of interest, these integers do not apply to all musical keys in the natural scale, and it was for this reason that the tempered scale was developed.

Column III displays the note compositions of various chords. The dots arranged in columns represent the notes of Column I played in each of the various chords.

Column IV lists the tempered scale frequencies of the notes of Column I as related to the fourth octave. Frequencies in the other octaves are related by a factor of two (2) for each successive octave.

Column V lists the decimal ratios, as determined by the previously described ratio, $(1.0594631)^n/1$, relating the tempered scale note frequencies of Column IV. By way of illustration of this relationship, the frequency of $C_4$ is found as follows: again, $A_4 = 440$ Hz is chosen as standard and by the octave relationship, $A_3 = A_4/2$; $A_3 = 440/2 = 220$; and $C_4/A_3 = (1.0594631)^3/1 = 1.18921/1$; $C_4 = A_3(1.18921) = 220(1.18921) = 261.625$ Hz. Note that 3-1 is the number of notes skipped between $A_3$ and $C_4$. The frequency of any note in the tempered scale may be similarly found.

Column VI lists the values of $n$ as related to the decimal ratios of Column V as illustrated above.

Column VII lists a sample set of pseudo-tempered scale integer ratios as determined by the previously described formula (3). The format and application of these integers is as was described for the natural scale integer ratios of Column II above. To illustrate the derivation of these integers, the familiar A6 chord described above is used: A, C sharp, E, and F sharp.

$$\frac{C_5 \text{ sharp}}{A_4} = \frac{N'}{N} \approx \frac{N(1.0594631)^4}{N} = \frac{N(1.25992)}{N} \approx \frac{44}{35} \cdots \cdots \frac{111}{88}$$

$$\frac{E_5}{A_4} = \frac{N'}{N} \approx \frac{N(1.0594631)^7}{N} = \frac{N(1.49831)}{N} \approx \frac{3}{2} \cdots \cdots \frac{132}{88}$$

$$\frac{F_5 \text{ sharp}}{A_4} = \frac{N'}{N} \approx \frac{N(1.0594631)^9}{N} = \frac{N(1.68179)}{N} \approx \frac{37}{22} \cdots \cdots \frac{148}{88}$$

3. $N'/N \sim [N(1.0594631)^n]/N$, and by choosing integer values of N which produce near integers when multiplied by $(1.0594631)^n$ for various whole-number values of $n$, N' being selected integers nearest the computed near integers with minimal error. When this is done, by trial and error, a pseudo-tempered major scale of integers can be developed, for example, as follows: 22-33-35-37-44-66-70-74-83-88-99-105-111-132-140-148-etc. which are comparable with a natural major scale of integers: 4-5-6-8-9-10-12-15-16-18-20-24-25-27-30-32-36-40-45-etc.

To more fully understand how these integers are related and how the pseudo-tempered tones correspond to natural and tempered scale notes, reference is made to the chart of FIG. 3.

Column I of this chart identifies notes.

Again, it should be noted that 4-1 is the number of tones skipped between $A_4$ and $C_5$ sharp; 7-1 between $A_4$ and $E_5$; and 9-1 between $A_4$ and $F_5$ sharp. These pseudo-tempered scale integers are related in a manner similar to the natural scale by formula (2):

$$\frac{f_1}{N} = \frac{f_2}{N'} = \frac{440}{88} = \frac{555}{111} = \frac{660}{132} = \frac{740}{148} = 5\text{Hz} = f_0$$

Thus, these pseudo-tempered scale notes lie in an arithmetic progression whose first term and common difference, $f_0$ is 5 Hz. It should be observed that the frequencies of these pseudo-tempered scale tones are very nearly equal to those of the tempered scale as related to those depicted in Column IV.

Once a set of integers and corresponding pseudo-tempered scale frequencies which set the value of $f_0$ is found, it is easy to shift from one musical key to another, using the same set of integers, by multiplying $f_o$ by $(1.0594631)^n$, where $n-1$ is the number of tones skipped in changing key. The values of $n$ in Column VI and corresponding decimal ratios of Column V may be used in this connection. This is to say that the first term and common difference, $f_o$ in each arithmetic progression of tones in each key lie in a geometric progression whose common ratio is 1.0594631/1. For example, shifting from the key of A above to the key of C two notes are skipped; therefore, $n = 3$, and $f_o = 5(1.0594631)^3$ or $5(1.18921) = 5.946$. The frequencies of the c6 chord are: $C_5 = 5.946(88) = 523.248$; $E_5 = 5.946(111) = 660$; $G_5 = 5.946(132) = 784.872$; and $A_5 = 5.946(148) = 880$ Hz as related to the fifth octave. It is seen once again that these frequencies are close to the tempered frequencies.

The PTS generators 17, 19, 49, 55, and 64, and the high-frequency generator 51, may be of the type described in ELECTRONICS, CIRCUIT DESIGNER'S CASEBOOK, 14-6, Page 4, McGraw-Hill, however, other tone generators will also work.

It may be recalled that $f_o$ in the pseudo-tempered A6 chord was 5 Hz which is equal to 60/12 and is therefore compatible with the 60 Hz line frequency. Since the retrace rate of the traced curves is a function of $f_o$, 5 Hz may be doubled twice to obtain 20 Hz, a much more satisfactory value.

Figure 2A:
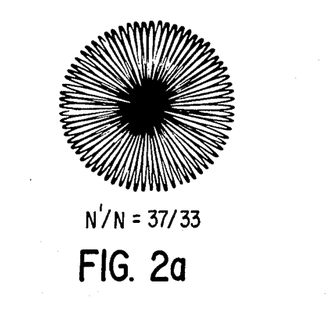
FIGS. 2a-k are diagrammatic representations of a few sample patterns generated by the system of FIG. 1.

In operation of the system of FIG. 1, any two tones appearing in any chord, in any key, in any octave could be chosen as the operating frequencies of PTS generators 17 and 19. As an example, the signal generated by PTS generator 17 could have a frequency of 740 Hz and the signal produced by the PTS generator 19 could have a frequency of 660 Hz. These frequencies are in an arithmetic progression whose common difference is 20 Hz with 740 being the product of 37 × 20 and 660 being the product of 33 × 20. Thus, the ratio of these two frequencies, one to the other is $N'/N = 37/33$. These signals, when applied through the previously described X- and Y-signal processing circuits to the X- and Y-deflection drive circuits 35 and 37, in the absence of a modulating signal applied by the amplitude modulation driver 33, produce an unmodulated prolate hypotrochoid curve or pattern such as is depicted in FIG. 2a, having 70 petals or loops. The number 70 is the sum of the integers 33 and 37 in the aforementioned ratio. The patterns of FIGS. 2c-h are also 70 petaled prolate hypotrochoids, but these have been modified by music as is described below.

In explanation of a prolate hypotrochoid, roulettes are curves traced by a point fixed to a curve which rolls, without slip, on a curve. Roulettes may also be generated by a multiplicity of rolling circles wherein only one circle is in contact with the fixed circle and only one rolling circle carries a trace point. When only two circles are involved in the curve generation, trochoids are generated by a trace point fixed at some radius, $r_T$ from the center of the rolling circle of radius, $r_R$ as it rolls on a fixed circle of radius, $r_F$. The circles may have rolling contact by any of various means since the values assigned to $r_T$, $r_R$, and $r_F$ are in no way limited relative to each other. If the point of rolling contact is inside the fixed circle, the curve traced is a hypotrochoid which retraces itself when the ratio $$\frac{[(r_F/r_R) - 1]\theta}{\theta}$$

is set equal to a ratio of integers such as $N'/N$ above; $\theta$ being the angle between a line connecting the centers of the circles and the X-axis. In the application of hypotrochoids to music, the integers are selected to be musically related, such as $N' = 37$ and $N = 33$ in the example above. Test results, using an electronic analog of trochoid curve generation, have shown that hypotrochoids are more beautiful, as opposed to epitrochoids and that their beauty is further enhanced if they are made prolate, where $R_T > r_R$ and each loop passes through the center of the fixed circle by setting $r_T = (r_F - r_R)$. The integer $(N + N')$ is the number of loops in the prolate hypotrochoid; and, its value may or may not be a musical integer depending upon the number of musical tones skipped between N and N'.

Figure 2B:
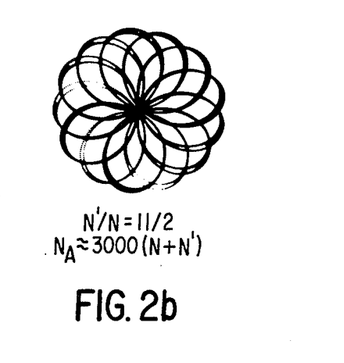
Figure 2C:
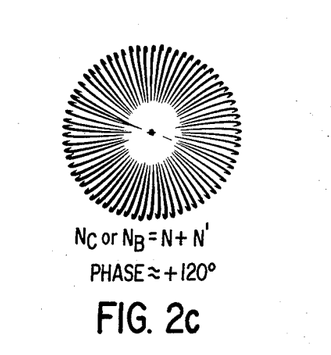

Now assume that a signal derived from the audio input 11 is fed to the amplitude modulation driver 33 via the X-, Y-amplitude modulation summer 41, many of the frequencies available in this signal will be derived from tempered scale music notes. When the modulating tones are a sequence of tempered scale tone frequencies, the resulting sequence of roulettes traced may each be visualized as a trace formed by a trace point attached to one of two rolling circles, the rolling circle not carrying the trace point being also in rolling contact with a third fixed circle. These roulette curves or patterns resemble flowers and sunbursts which fit into three broad categories:

1. Flowers whose petals may or may not be perfoliate and arranged into radial groups of smaller petals, as shown in FIG. 2k.
2. Flowers whose petals are arranged into concentric groups of smaller petals, as in FIG. 2j.
3. Sunbursts as where the petals of the flowers are arranged into radial, eccentric groups of smaller petals, as in FIG. 2i.

When the modulating tone is pure, and its integer $N_A$ is less than $N + N'$, the petals are well formed and symmetrical with respect to their radial center lines; if $N_A$ is greater than $N + N'$, and the ratio of it to $N + N'$ is an integer, the petals are serrated. If the modulating tone is rich in harmonics, the petals assume beautiful shapes of all varieties. It should be noted that no discrete phasing of the modulating tones is required to produce well formed, symmetrical, coherent patterns.

Thus, it is seen that each modulating musical tone has its own "signature" or pattern which is responsive to each and every nuance of the music for a given value of $N'/N$. Conversely, the pattern produced by a given modulating tone is different for each value of $N'/N$. The ratio $N'/N$ may be changed, as often as is desired, for variety or unique effect.

With regard to operation of the color portion of the circuit, the roulettes are given color by filtered-out bands of tones from the audio-derived signals issuing from filters 57, 58, and 59. These filtered-out tone bands are each split into component phases 0°, +120°, and −120°. The like, or nearly like, phase components are then respectively applied to red, green, and blue color output circuits such that each tone in each frequency band — high, middle and low — produces a full rainbow of colors which give the roulettes an endless variety of patterns of color. The order of phase and color relationship is inconsequential, the results being similar for any order. The sole purpose of the filters is to reduce phase error in the phase shifters 69 and 73 due to frequency variation. It should be appreciated that since the X- and Y-deflection circuits are driven by pseudo-tempered scale music signals which are amplitude modulated by performed or audio-derived tempered scale music signals, and since the signals driving the color output circuits are the same as the amplitude modulation signals, the colors will be coherently arranged in the instantaneous or sustained roulette patterns produced at any given instant or period of time.

Figure 2D:
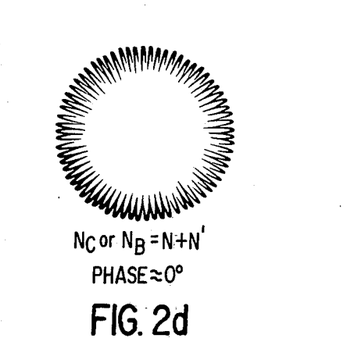
Figure 2E:
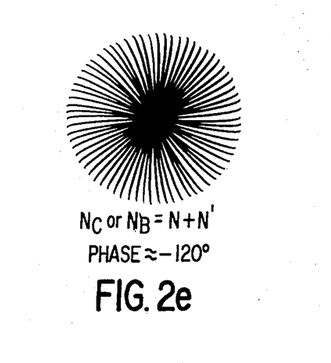

For example, in the $N'/N = 37/33$ unmodulated hypotrochoid example above, if a color reference signal from the PTS generator 64, whose integer $N_c = N + N' = 33 + 37 = 70$, is applied to the chroma mixer 61, by closing switch 63, the signal is split into three phases and applied to red, green, and blue control elements to produce respective patterns as shown in FIGS. 2d, c, and e. Where red overlaps green, yellow is produced; where green overlaps blue, cyan is produced; etc. The result is that each of the 70 loops of the hypotrochoid is color modulated into a rainbow of color in a coherent fashion such that concentric rings of rainbow colors are produced. If $N + N'$ is not quite a perfect integer, the concentric rings of rainbow colors will slowly expand toward the periphery and, in turn, contract toward the center as a result of the signal's phase varying through 360° due to its frequency deviation from a perfect integer value.

Figure 2F:
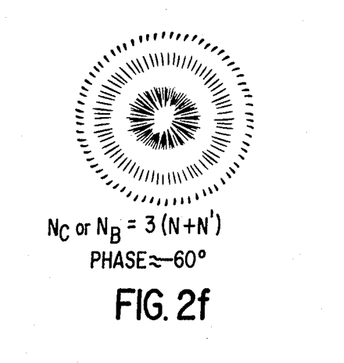
Figure 2G:
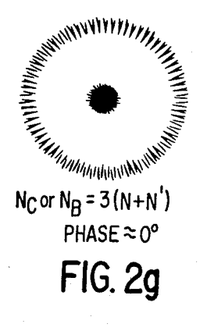

With regard to brightness modulation, if a brightness reference signal from PTS generator 55, whose frequency integer is: $N_B = 3(N + N') = 3(33 + 37) = 3(70) = 210$ is applied to the brightness control elements via the luminous summer 42 by closing switch 53, three concentric rings of the rainbow colors, as produced and described above, are made brighter and three made dimmer (or blanked out as desired) as shown in FIG. 2f. If $N_B$ is not quite a perfect integer, which is desirable, the concentric rings of brightened, or tinted, colors will slowly interchange position as a result of the signals's phase varying through 360°, and if the phase varys at a slightly diffeent rate than the color reference signal, the result is an ever-changing triad of tinted concentric rings. Two such phase relationships are shown in FIGS. 2f and g.

Turning now to the simultaneous effects of an audio-derived signal on color, brightness, and amplitude modulation whose respective frequency integers $N_C$, $N_B$, and $N_A$ are equal, to avoid confusion, it is convenient, to remove the above color and brightness reference signals by opening switches 63 and 53. Suppose the audio input signal 11 is a pure tone where $N_C = N_B = N_A = 3(N) = 3(33) = 99$. This signal is applied simultaneously to the chroma mixer 61, the luminous summer 42, and the X-,Y-amplitude modulation summer 41 through the signal processing circuits of FIG. 1.

Figure 2H:
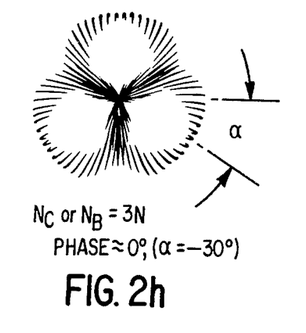

First considering color, the signal is split into phase components and applied to the red, green, and blue control elements of the kinescope 15. The pattern produced by the red signal, whose phase is unshifted or 0°, is shown in FIG. 2h positioned at $\alpha = -30°$. The green, +120° phase, signal produces the same pattern positioned at $\alpha = +10°$. The blue, −120° phase, signal also produces the same pattern positioned at $\alpha = -70°$. The overlapping colors give complementary colors.

Next considering brightness, the signal is applied to the brightness control elements of the kinescope 15. The result is to brighten one pattern of rainbow segment color produced above which may be varied by the manual phase shifter 56 to vary the relative phase between the color and brightness signals which, in effect, varies the tint of a "lighted roulette" formed upon the hypotrochoid in FIG. 2a as in FIG. 2h.

Now turning to amplitude modulation, the signal is applied to the amplitude modulation driver 33 generating a three-cusped epitrochoid in conjunction with the 70 looped prolate hypotrochoid being generated as previously described and shown in FIG. 2a, to produce the roulette of FIG. 2k. The colors are "lifted" or separated out such that each group of small loops displays a full rainbow of colors wherein each corresponding small loop of each group displays the same segment of the rainbow. Since the brightness and amplitude modulation signals are in phase, the small loop in the center of each group of small loops will be the brightest. By varying the phase of the color signal with respect to the brightness signal, using the manual phase shifter 56, any segment of the rainbow may be brought into register with the brightest small loop in each of the three groups of small loops.

The total effect, putting all these together by closing switches 63 and 53 restoring the color and brightness reference signals, is a beautiful pattern of changing colored dots and dashes, not unlike spectacular aerial fireworks. If $N_C = N_B = N_A$ is not a perfect integer, the roulette pattern of colored dots and dashes will assume revolving motion at some rate as a function of the audio-derived signal tempered scale frequency deviation from the pseudo-tempered scale tone frequencies; also in this connection, vibrato in a musical instrument or tremolo in a singer's voice is easily observed and appreciated. The pattern of the display is different for each musical tone, its harmonic content, its strength or amplitude, its attack and decay, etc. and well as tone combinations or chords.

Figure 2I:
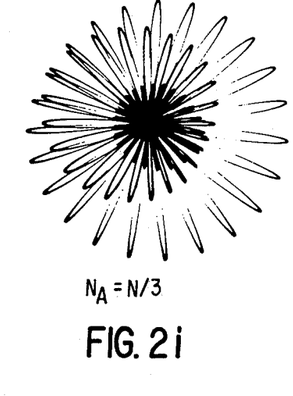
Figure 2J:
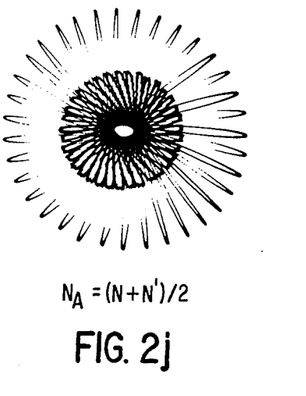
Figure 2K:
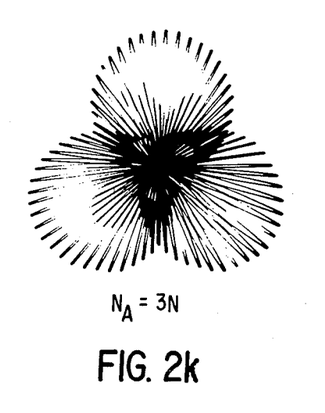

A pure pseudo-tempered scale tone produced by the PTS generator 49 may be added to the X-,Y-modulation circuit by closing switch 45 to change the basic prolate hypotrochoid being modulated by the audio-derived signals to a more complex form or roulette. FIGS. 2i, j, and k show three examples where the integer of the added amplitude modulating tone, $N_A$ has two different values relative to N and one value relative to $N + N'$.

The width of the traced curve may be increased by closing switch 47, thereby inserting a high-frequency signal from a high-frequency generator 51 to amplitude modulate the trace, as shown in FIG. 2b.

It should be understood that any combination of these modes of operation could be used together.

While the invention has been particularly shown and described with reference to a preferred embodiment, it will be understood by those skilled in the art that various changes in form and detail may be made therein without departing from the spirit and scope of the invention.

For example, the audio-derived signal could be phase shifted in accordance with any of its physical characteristics, such as its envelope, for example, prior to its being fed into the filters 57, 58, and 59 in order to vary its phase with time and thereby create additional changes in the color input.

Further, variable frequency response amplifiers (known in the audio field as tone control amplifiers with base and treble controls) may be inserted between the voltage control amplifier 39 and the X-,Y-amplitude modulation summer 41; the luminous summer 42; and the manual phase shifter 56 to independently control the effects of bass and treble tones on X-,Y-modulation, brightness and color.

In addition, an electronic musical instrument of any kind capable of producing sustained, pure, synthetic tones, tuned very nearly perfect to the tempered scale wherein each tone is provided with quadrature signal outputs, may be used in lieu of PTS generators 17 and 19 and phase shifters 23 and 27 for certain discrete musical ratios, provided either frequency deviates from perfect integer values by less than, say one-half Hertz. The effect of a small error is to cause the unmodulated hypotrochoid generated to slowly revolve. The reference signals would have to be specially generated and tuned to the particular musical instrument being used.

Still further, pre-recorded phased and summed tones in any musical ratio may be provided by a two channel tape player, the outputs being fed directly to the X- and Y- deflection modulators 29 and 31 with additional channels providing color and brightness reference signals being fed directly to the chroma mixer 61 and the luminous summer 42 respectively; or, a single channel may provide all signals mixed, the output being fed to a bank of narrow-pass filters followed by phase shifters and summers as is required.

Also, the PTS generators 17 and 19 and the phase shifters 23 and 27, could be replaced by quadrature oscillators. Precision phase and amplitude control would be required.

In addition, it is recognized that the solution of the general equations:

$$x = (r_F \pm r_r)\cos \theta \mp r_T \cos[(r_F/r_R) \pm 1] \theta$$

$$y = (r_F \pm r_R)\sin \theta - r_T \sin[(r_F/r_R) \pm 1] \theta$$

upper signs, epitrochoid
lower signs, hypotrochoid may be found by any of various other linear and/or non-linear methods as varying other conditions are imposed upon $r_F$, $r_R$, $r_T$, and $\theta$. In the preferred embodiment, the general equations are solved, setting $r_T = (r_F - r_R)$, for hypotrochoids using synthetic fixed frequency pseudo-tempered scale tones. Another solution is simultaneously made, setting $r_T = r_R = r_F$, for epitrochoids using either of the fixed frequency signals, or their sum harmonic, or their difference harmonic in conjunction with tempered scale music tones. The result of the simultaneous solutions is to produce roulettes. Thus, it is clear that many other solutions, too numerous to cite here, are possible.

Further, if a tri-color display screen with a trace system, composed of whatever components, responsive to radio frequencies as well as audio frequencies is used, high-frequency generator 51 could generate radio frequency signals and be used:

1. To increase the width of the traced curve, as illustrated in FIG. 2b, such that the loops overlap thus providing excellent color mixing with all vestiges of sawtooth effect eliminated, giving the roulettes the appearance of being made of beautifully shaped, overlapping sheets of varigated glass.

2. To give the roulettes the appearance of being composed of varigated glass tubing, by switching the signal from the X-,Y-amplitude modulation summer 41 to the 0° signal summer 21 and to the +90°, −90° signal summer 25 via either a +90° or a −90° phase shifter added to the system of FIG. 1.

The embodiments of the invention in which an exclusive property or privilege are claimed are defined as follows:

1. A system for creating and displaying colored roulette curves representative of performed music comprising:
    a display means for converting signals into a visual display, said display means including a screen, an X-,Y-deflection means for moving a trace on said screen, and a color means for determining the color of said trace; and
    an X-,Y-deflection control means including a signal producing means for producing at least two synthetic musically-related signals having frequencies $f_1$ and $f_2$ in a ratio of integers one to the other, where said frequencies $f_1$ and $f_2$ are very nearly equal to the frequencies of notes in a standard music scale, modulation means for modulating each of said at least two synthetic signals by performed-music signals, and a means for applying said modulated signals to said X-,Y-deflection means to thereby produce roulette curves on said screen having elements related to the physical characteristics of said at least two synthetic signals as well as those of said performed-music signals; and
    a music-signal processing means for receiving said performed-music signals and for further modifying the physical characteristics of said visual display in a manner responsive to the physical characteristics of said performed-music signals.

2. A system as claimed in claim 1 wherein said music-signal processing means includes a means for dividing said performed-music signals into a plurality of components phase shifted from one another, and for applying each of said phase-shifted components to said color means with respective like phase-shifted components determining respective different colors produced by said color means.

3. A system as claimed in claim 1 wherein said frequencies $f_1$ and $f_2$ are very nearly equal to frequencies of notes in the Tempered Music Scale.

4. A system as claimed in claim 3 wherein said ratio of integers are related in accordance with the formula $N'/N \approx [N(1.0594631)^n)]/N$, where N and N' are said integers, $n-1$ is the number of tones skipped between tones, corresponding in frequency to said $f_1$ and $f_2$, in said tempered music scale, and $(1.0594631)/1$ is the common ratio in the geometric progression of adjacent tone frequencies in said tempered music scale.

5. A system as claimed in claim 2 wherein said music-signal phase-shifting means includes a means responsive to discrete tones or tone bands prior to division of said music performed-music signals into said phase-shifted components for reducing the phase error in said phase-shifted components to improve color.

6. A system as claimed in claim 1 wherein the physical characteristics of said visual display modified by said performed-music-signal processing means includes trace brightness and trace color and wherein said music-signal processing means includes a means for controlling the relative phase between said performed-music signals used to determine the brightness of said trace and said performed-music signals to determine the color of said trace, to thereby determine the tint of said trace.

7. A system as claimed in claim 1 wherein the physical characteristics of said visual display modified by said performed-music-signal processing means includes trace brightness and wherein said music-signal processing means includes a means for controlling the relative phase between said performed-music signals used in determining the brightness of said trace and said performed-music signals used in said modulation means to avoid blanking of said trace with X-,Y-deflection of said trace.

8. A system as claimed in claim 1 wherein said X-,Y-deflection control means also includes a means for splitting each of said at least two signals into first and second quadrature components and a means for summing said first components and for summing said second components, there being approximately a 90° phase difference between said respective first and second components, one second component leading its respective first component and the other lagging its respective first component, such that when said plurality of summed components are applied to said X-,Y-deflection means, in the absence of modulation by said modulation means, a hypotrochoid curve is generated by said trace.

9. A system as claimed in claim 8 wherein said signal producing means includes a means for determining the amplitude of each of said at least two signals to cause said hypotrochoid curve to be prolated or looped wherein each loop is traced through zero X-,Y-deflection.

10. A system as claimed in claim 1 wherein the physical characteristics of said visual display modified by said music-signal processing means include trace brightness and trace color and wherein said music-signal processing means includes a signal producing means for producing at least one synthetic reference signal having a frequency related to said $f_1$ and $f_2$ and means for summing said synthetic reference signal to said performed-music signals prior to said performed-music signals being used for modifying color and brightness of said trace on said screen, to thereby produce a greater variety of colors and tints in solo tone produced roulettes in particular.

11. A system as claimed in claim 10 wherein said signal producing means produces a plurality of synthetic reference signals and wherein said reference-signal frequencies are each independently in a ratio of integers to either of $f_1, f_2, (f_1 + f_2)$, or $(f_2 - f_1)$.

* * * * *

UNITED STATES PATENT AND TRADEMARK OFFICE
CERTIFICATE OF CORRECTION

PATENT NO. : 3,969,972
DATED : July 20, 1976
INVENTOR(S) : Robert L. Bryant

It is certified that error appears in the above-identified patent and that said Letters Patent are hereby corrected as shown below:

In the abstract, line 11, the equation should appear as follows:

$$[N(1.0594631)^n]/N$$

Column 3, line 41, change "'75" to --'74--; line 57 delete "of". Column 6, line 8, the equation should appear as follows:

$$C_4 = 440(3/5) = 264 \text{ Hz}$$

and, line 11, the third equation should appear as follows:

$$E_4 = 264(5/4) = 330 \text{ Hz}$$

Column 7, line 12, change "c6" to --C6--. Column 8, line 12, change "$R_T$" to --$r_T$--. Column 11, line 35, the equation should appear as follows:

$$X = (r_F \pm r_R) \cos \theta \mp r_T \cos [(r_F/r_R) \pm 1] \theta$$

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*